United States Patent [19]

Amberg

[11] 4,256,028

[45] Mar. 17, 1981

[54] METHOD AND APPARATUS FOR MAKING PLASTIC PREFORMS FOR PACKAGING CONTAINERS

[75] Inventor: Stephen W. Amberg, Toledo, Ohio

[73] Assignee: Owens-Illinois, Inc., Toledo, Ohio

[21] Appl. No.: 73,397

[22] Filed: Sep. 7, 1979

[51] Int. Cl.³ .......................... B31B 49/00; B31C 1/00
[52] U.S. Cl. .................................. 493/287; 493/111; 493/196; 493/235
[58] Field of Search .................. 93/81 R, 84 TW, 19, 93/20, 13, 14, 32, 36.8, 34, 35 R, 94 PS, 94 FC, 94 R, 77 R; 53/562, 563, 557, 556, 140, 48, 442

[56] References Cited

U.S. PATENT DOCUMENTS

| | | | |
|---|---|---|---|
| 2,163,318 | 6/1939 | Scusa et al. | 93/81 R |
| 3,252,387 | 5/1966 | Schur | 93/81 R |
| 3,352,214 | 11/1967 | McColgan | 93/84 TW |
| 3,400,810 | 9/1968 | Makowski | 53/48 X |
| 3,507,094 | 4/1970 | Coles | 53/563 |
| 3,656,274 | 4/1972 | Vind | 53/562 |
| 3,762,282 | 10/1973 | Van der Meulen | 93/84 TW X |
| 3,834,525 | 9/1974 | Morgese et al. | 53/48 X |
| 3,855,907 | 12/1974 | Johnson et al. | 53/562 X |
| 4,151,787 | 5/1979 | Rohr et al. | 93/32 |

Primary Examiner—James F. Coan
Attorney, Agent, or Firm—E. J. Holler

[57] ABSTRACT

This invention relates to method and apparatus for making plastic tubular preforms for assemblying bottles or other containers into individual mutli-unit packages. The bottles for an integral multi-container package are arranged in a tightly-assembled group and the tubular preform is placed around the group. The tubular preform is formed from a lengthy sheet of flexible heat-shrinkable thermoplastic material which preferably is comprised of a composite foam and film laminate with the preform having a thermal fusion seal extending in an axial direction. The preform is flat-folded with a pair of axial pleated folds in diametrically opposite sides and then double-folded centrally for use in multiple unit packaging of like containers. The preforms has a primary orientation in a circumferential direction and a secondary orientation in an axial direction making it particularly useful when fully opened for heat shrinking around a group of like containers. This invention pertains to the method and apparatus for making such tubular preform which in heat-shrunken condition forms a tight package convenient for handling, shipment and use.

26 Claims, 15 Drawing Figures

METHOD AND APPARATUS FOR MAKING PLASTIC PREFORMS FOR PACKAGING CONTAINERS

BACKGROUND OF THE INVENTION

1. Field of the Invention

This invention relates to the art of making tubular sleeves suitable for application to an assembled group of containers, such as glass bottles and the like, and more specifically to the method and apparatus for making a prescribed tubular plastic preform having unique physical properties. The tubular sleeve constitutes novel banding material and structure especially desirable for assemblying and heat-shrinking around the grouped containers so that the major exposed surfaces of such similar containers are held in tightly-constrained tangential relation.

2. Description of the Prior Art

It is common practice to merchandise many items such as containers for soft drinks, beer and the like, in packages containing a number of containers with the package normally including a handle or other handholding means to facilitate carrying the package. A most common package consists of a relatively-rigid paperboard blank formed around a group of containers, normally six or eight, with the folded blank usually being interlocked with itself and a plurality of similar containers in the package. The paperboard packages normally require partitions between individual containers, especially in the case of glass bottles, to avoid surface-to-surface contact. These paperboard blank packages have not been entirely satisfactory in that they are relatively expensive and are comparatively difficult to form, particularly with the high speeds required by modern filling, capping and packaging machines.

To overcome these and other deficiencies of the folded paperboard blank, cans have recently been packaged by assemblying the cans with a multi-apertured carrier formed from a sheet of resilient plastic material with the beaded end of the cans each being inserted through the apertures. The periphery of the apertures grasp the sidewalls of the cans and is locked beneath the bead securely enough to permit carrying of the package by a handle or finger holes formed in a central portion of the resilient plastic carrier. Heretofore, it has not been considered practical to package bottles in this manner because the elongated neck and shoulder portion projecting upwardly from the cylindrical body portion have made existing methods and apparatus for the retention of cans in a multi-pack impractical or unduly expensive for packaging bottles. Further, the relatively great distance over which the carrier must be moved in its application onto the body portion of the bottles has made it necessary to install the carrier on successive bottles substantially simultaneoulsy to avoid excessive distortion and tearing of the plastic carrier. Also, the side surfaces of bottles require additional retention means such as an encompassing band to avoid surface-to-surface impact of the bottles during handling, shipment and disassembly of the package. Such apparatus for packaging containers is disclosed in U.S. Pat. No. 3,509,684 to Hohl and Schribner, which patent is assigned to the same common assignee as the present patent application.

More recently, the introduction of shrinkable plastic overwraps has occurred causing drastic changes in the paperboard packages of the past. The following U.S. patents are representative of packages using plastic overwraps of various types. Most of these disclosures ae directed to various transparent film-type non-foamed shrink-wrap packages and to the use of prescribed handles, fingerholds and related supporting structures.

U.S. Pat. Nos. 3,532,214, 3,198,327, 3,552,559, 3,834,525, U.S. Pat. No. RE. 28,535, U.S. Pat. Nos. 3,650,394, 3,650,395, 3,817,373, 3,416,288, 3,747,749, 3,331,503, 3,302,784, 3,477,564, 3,756,397 and 3,217,874.

Multi-container packages which utilize transparent thermoplastic films are suitable for many applications; however, their use for packaging glass containers which contain light-sensitive comestibles such as beer is undesirable. Also such films do not provide the desired level of impact protection for a multi-pack of glass containers. Further, such films can be decorated with advertising information only with difficulty requiring the use of supplemental labels or wrappers for product identification.

The use of foamed polystyrene for shrink wrapping of multi-pack integral packages is disclosed in U.S. Pat. No. 3,400,810. However, the foamed polystyrene taught by this patent is biaxially oriented and will shrink generally uniformly in both directions. This type of overwrap in heat-shrunken condition exhibits generally the same strength properties in both directions, thus making expedient removal of the individual containers somewhat difficult. With this material, it is also difficult to form end seals of the flaps at the package ends due to both axial and circumferential shrinkage of the overwrap.

SUMMARY OF THE INVENTION

Accordingly, it is an object of this invention to provide method and apparatus for making an improved tubular sleeve for assembling bottles into integral multi-pack packages for most convenient handling, shipment and use.

Another object is to provide an improved method for the manufacture of a folded tubular preform comprised of resilient heat-shrinkable thermoplastic material adapted to telescopically surround a group of assembled bottles when opened to form a unitary package upon shrinking for convenient handling and shipment.

Another object is to provide an improved apparatus for the manufacture of a flexible heat-shrinkable tubular sleeve which is pre-oriented in both its circumferential and axial directions adapted to unique folding for its convenient stacking, shipment and subsequent use in assemblying machines designed to open the sleeve and place the same telescopically around a group of bottles to form an integral package. The sleeve upon shrinkage is strong and provides cushioning protection to the surrounded bottles and yet is easily opened, is opaque to light for protecting the container contents, and is capable of being pre-printed with information or decoration prior to application.

Another object of this invention is to provide method and apparatus for making a tubular band or sleeve which is formed and folded with an axial thermal fusion seal, and with minimal overlap of its folds and seal, the sleeve being designed to be packaged and shipped in multi-unit packages for subsequent opening and application to grouped similarly-shaped containers encompassing their major exteriorly-exposed surfaces.

A further object of this invention is to provide a method of forming a tubular sleeve of banding material comprised of flexible foamed sheet thermoplastic material which is heat-shrinkable having fold lines at opposite sides and a fusion seal along a bottom portion intermediate the side fold lines, the sleeve being adapted to uniform pile-type stacking for easy opening and usage. The tubular sleeve of banding material can thus be packaged flat in multi-pack units for delivery and use in conjunction with packaging machines adapted to moving spaced tightly-assembled groups of bottles through the apparatus for sleeve opening and telescopic assembly around the grouped bottles.

The tubular preformed sleeve made by the method and apparatus of this invention is thus especially adapted for use with high-speed filling and capping machines to receive the filled, capped bottles issuing from such machines and to form them into packages such as the conventional six-pack employed to merchandise soft drinks and beer. The bottles to be packaged are fed onto a horizontal conveyor in spaced groups each normally consisting of two parallel rows of three bottles each in upright side-by-side relation. The groups of bottles are carried by the conveyor past a sleeve-applying position with the groups then being telescopically deposited in individual sleeves. Adjacent the sleeve-applying position, flexible tubular sleeves are fed from a magazine in flat-folded condition, one at a time, onto an opening conveyor where they are subsequently picked up and retained by arms following which distention means serve to open the sleeves serially into generally-rectangular configuration. The opened sleeves are then moved arcuately downwardly and along the bottle conveyor where the bottle groups are telescoped into the tubular sleeves for deposition centrally therewithin. The sleeves containing the assembled bottles are then conveyed through a heat-shrinking tunnel over where the sleeves are heat-shrunk tightly around the grouped bottles. The sleeves are shrunk to a considerable extent around the major exposed surfaces of the bottles leaving only portions of the end bottles of the group slightly exposed.

The tubular sleeves made by the detailed procedure and mechanism of the present invention comprise a plastic overwrap which consists of opaque, prestretched and oriented, laminated composite thermoplastic material. The sleeves are primarily oriented in a circumferential direction and constitute a close cellular, foamed, thermoplastic, polyolefin layer laminated to a non-cellular thermoplastic polyolefin film. The sleeves in heat-shrunken condition circumscribe the assembled containers and snugly engage the tops of containers in shrink-fit relation.

The compacted folded structure of a heat-shrinkable polymeric sleeve made by this invention is preferably formed of composite sheet material having a layer of closed cellular foamed olefin polymer adhered to a layer of non-cellular olefin polymer film wherein the cellular layer is located on the inside of the sleeve adapted to enage with at least the tops and closures of the containers and the film is on the outside of the sleeve having a smooth glossy decorated surface. A basic form of the sleeve per se is presently disclosed and claimed in copending U.S. Patent Application Ser. No. 694,267, filed June 9, 1976, in the name of James E. Heider, entitled, "Merchandising Package for Containers." An improvement over such invention is presently disclosed and claimed in copending U.S. Patent Application Ser. No. 949,848, filed Oct. 10, 1978, in the names of Stephen W. Amberg and Robert J. Heier, entitled, "Tubular Preform for Packaging Containers", both of the above-identified patent applications being owned by the same assignee as the present application.

Further objects and advantages of the present invention will be apparent from the following detailed specification and reference to the accompanying drawings.

DESCRIPTION OF THE PREFERED EMBODIMENT

The machine of the present invention comprises several major components connected together as a unit for production of the plastic tubular sleeves in folded condition. The plurality of like containers around which the sleeves may be shrunken to form an integral package may consist of glass bottles such as disclosed in co-pending Patent Applications Ser. No. 695,846, filed June 9, 1976, in the name of James E. Heider, entitled, "Merchandising Package for Containers", and U.S. Patent Applications Ser. No. 949,846, filed Oct. 10, 1978, in the names of Stephen W. Amberg and Robert J. Heier, entitled, "Tubular Preform for Packaging Containers", both of which applications are owned by the same common assignee as the present application, and this invention constitutes an improvement thereover.

The disclosures of the above-identified patent applications are incorporated herein by reference.

Figure 1:
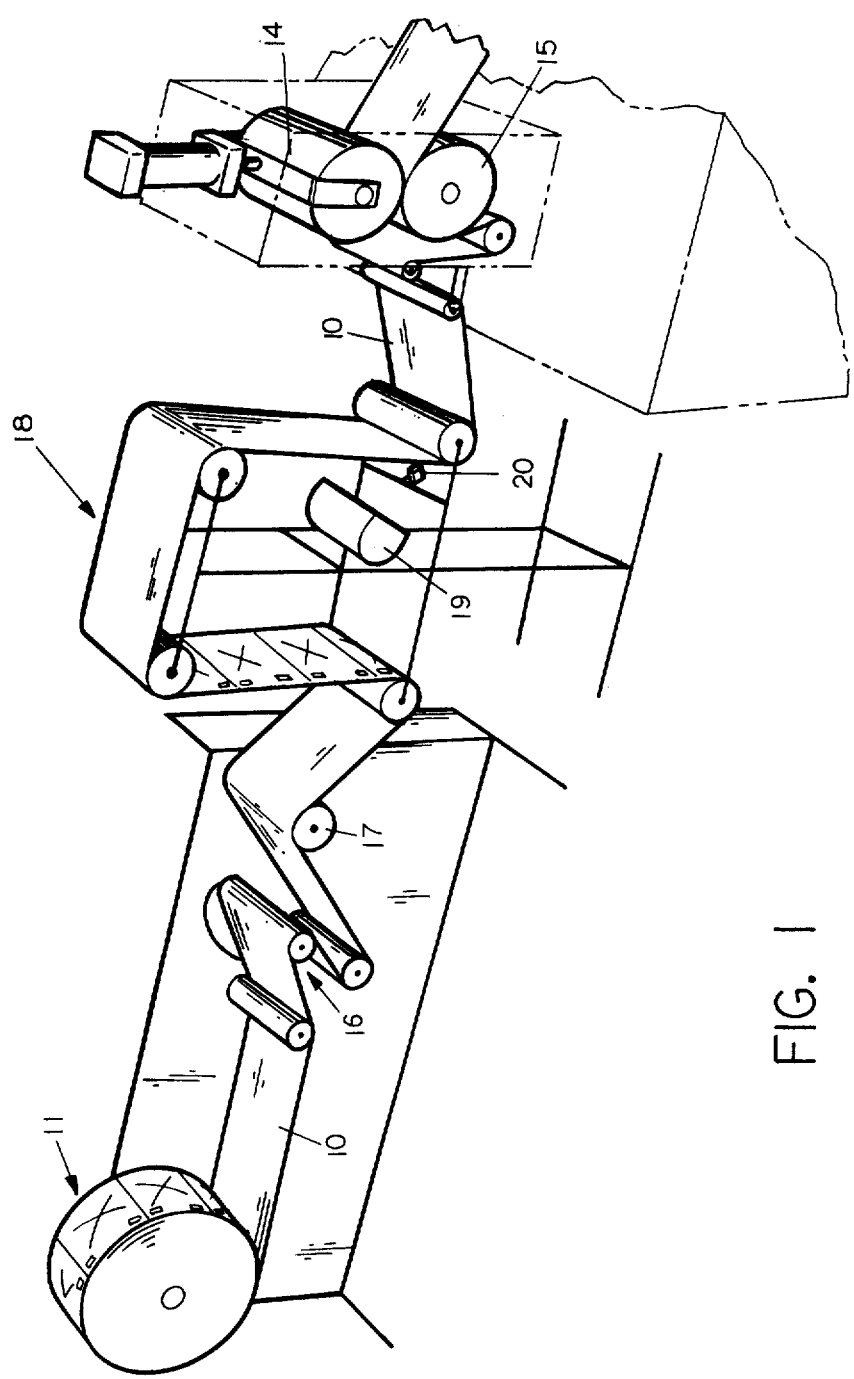
FIG. 1 is a perspective view of one embodiment of the present invention illustrating the infeed method and apparatus for delivery of the sleeve-forming roll stock.

With reference to the drawings, and particulary FIG. 1, a sheet 10 of thermoplastic material in the form of a continuous lengthy web or roll stock 11 is taken as the starting material from which individual blanks are severed and formed into individual tubular sleeves. The web is formed of preprinted heat-shrinkable foamed plastic material preferably laminated polymeric olefinic thermoplastic material such as polyethylene. The thermoplastic material in most desirable form is comprised of a sheet having uniform wall thickness with a layer of closed cell foamed olefin polymer firmly adhered to a non-cellular olefin polymeric film layer. The cellular foamed layer is preferably on the inside of the sheet material when formed into tubular sleeves and the non-cellular film layer is preferably on the outside of the sleeves presenting a smooth non-porous surface especially adapted to printing and decorting. The laminated composite material is impervious to air, light and water, and has a primary orientation in a circumferential direction when formed into a tubular sleeve. The material has a secondary orientation in the axial or tube direction when formed into a sleeve. The composite material in sheet form has a bulk density ranging from 2 to 30 pounds per cubic foot and particularly desirable tensile strrngth for wrapping a plurality of articles, such as containers, into a heat-shrink package. The laminated foamed and film sheet has an overall thickness preferably ranging from about 0.004 to 0.020 inch.

The tubular sheet is formed from a pre-stretched and oriented lengthy sheet or ribbon of cellular and non-cellular olefinic thermoplastic material which is preprinted or decorated on the smooth film side. The primary orientation of the material extends in major amount along the longitudinal or machine direction of the lengthy web as formed, and preferably has a shrinkage of about 70% as formed. An especially desirable material is a laminated foam and film polyethylene sheet having decorative patterns printed over its smooth film side for exteriorly-facing use.

Roll 11 is mounted on a roll stand as schematically shown in FIG. 1 from which it is unwound at a prescribed uniform rate. A pair of power driven horizontal rolls 14 and 15 serve to pull the web or sheet 10 of thermoplastic material from the roll stand through the machine. A series of tensioning rolls 16 is mounted adjacent the roll stand to deliver the web with uniform tension to the powered rolls 14 and 15, as well as to the working areas of the machine. The web is passed over an idler roll 17 and through an inspection station 18 where the web is examined to determine the accuracy and completeness of each of its printed decorative patterns. The web 10 is passed through an electronic comparator which compares each printed pattern with a standard image to ensure its acceptability for forming a tubular wrap. An intense light source 19 is directed at the continuously moving underside surface of the web to permit pick up of the web image by a receptor device 20 to obtain the electronic comparison. The web is moved in a rectangular arrangement over a series of four spaced-apart rolls for this inspection.

Figure 5:
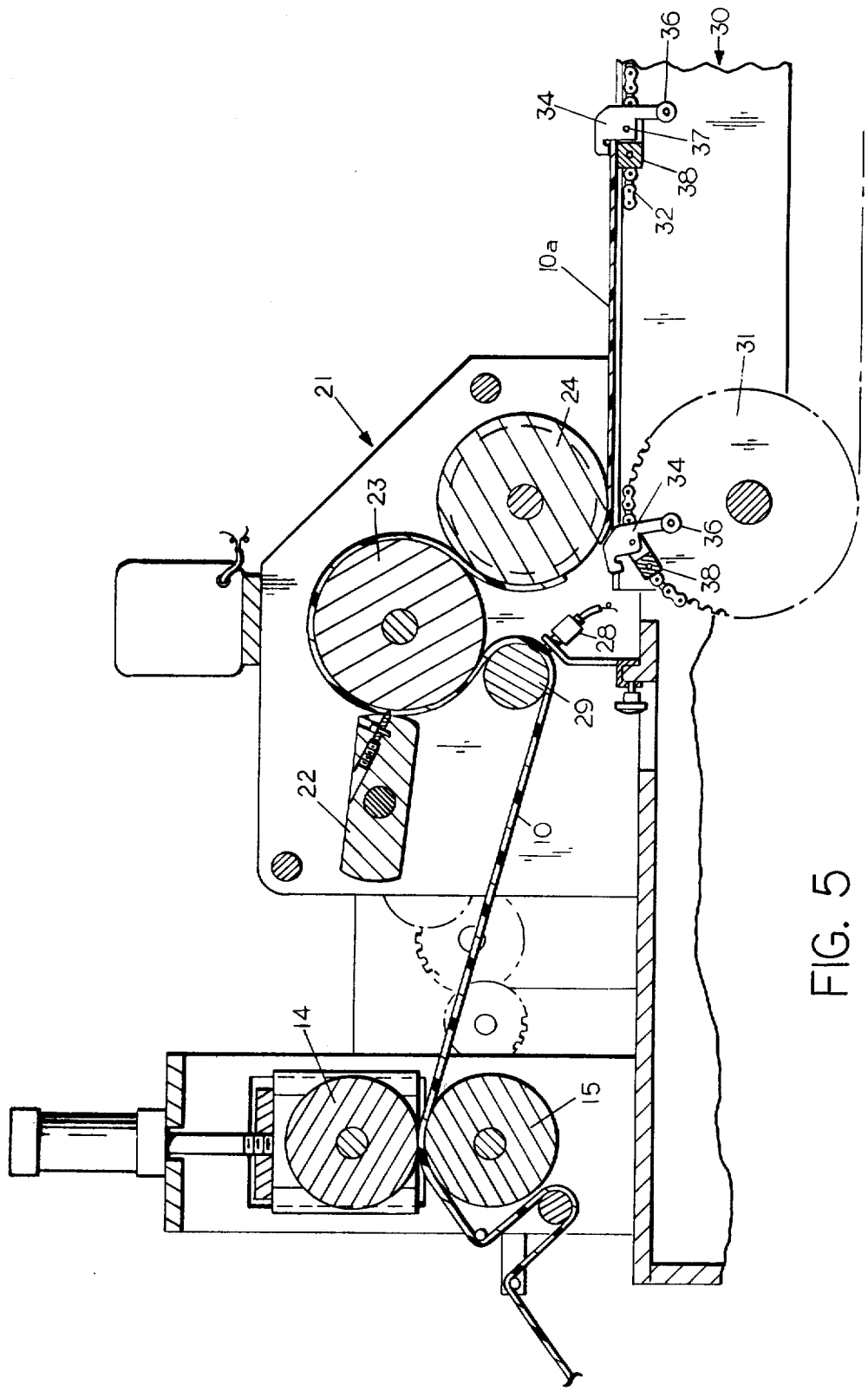
FIG. 5 is an enlarged vertical sectional view of the apparatus taken along the line 5—5 of FIG. 3.

Following inspection, the web 10 is moved through the pair of power-driven tangential rolls 14 and 15 to a severing station 21 as shown in FIG. 5 where the web is severed at spaced intervals which are undecorated between the printed patterns. The power rolls 14 and 15 are able to draw the web or sheet 10 at a uniform rate and at a prescribed tension to obtain desired delivery of the sheet to the severing station. The rolls 14 and 15 are similar and mounted in vertical array to drive the web therebetween. The severing station consists of a rotary knife member 22 which is tangetially mounted to cooperate with a back-up vacuum roll 23 having a resilient exterior surface. The web is cut on roll 23 at the undecorated areas into blanks 10a which have uniform length and width dimensions.

Figure 2:
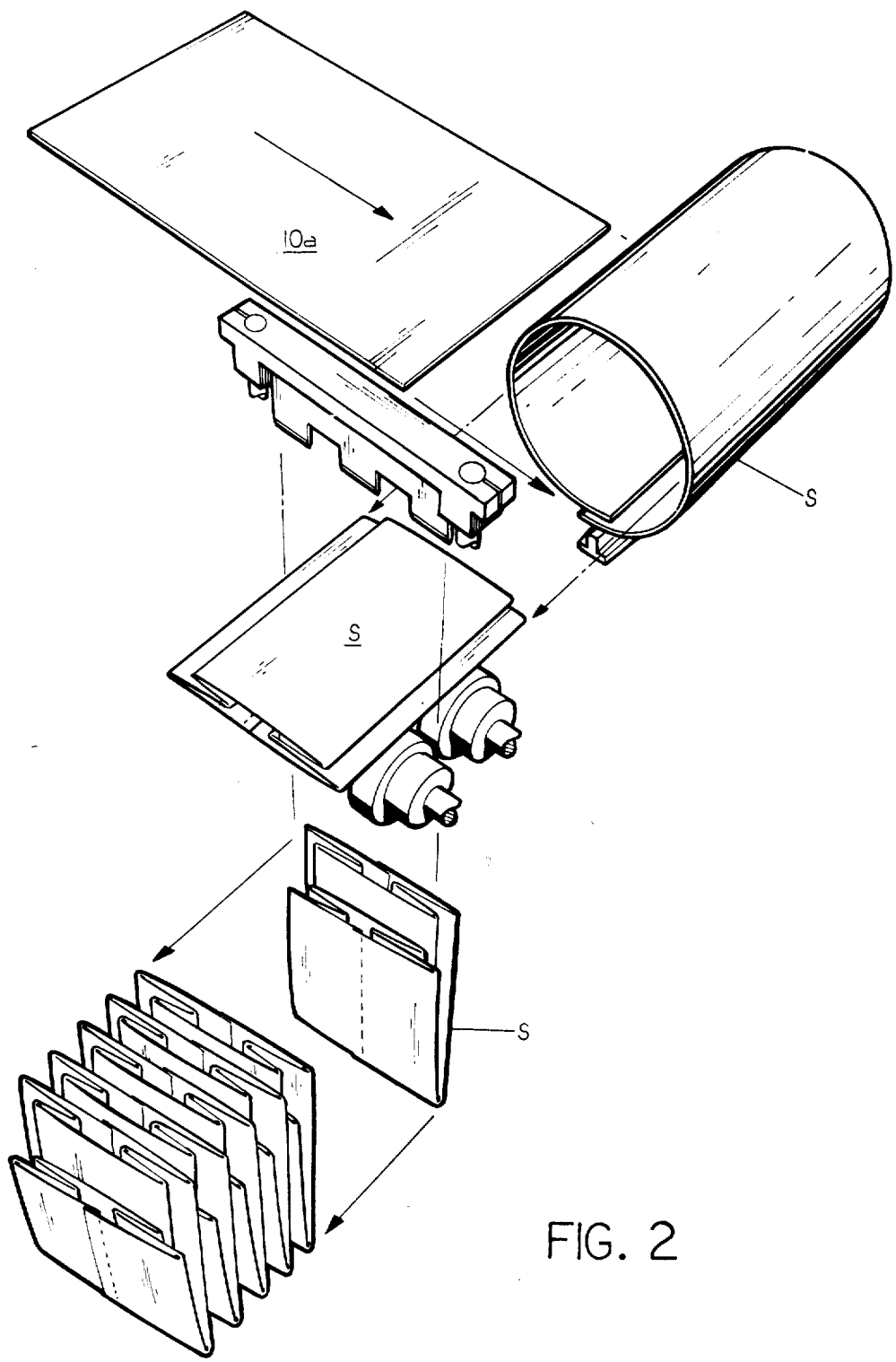
FIG. 2 is a schematic view of the basic sleeve forming method in accordance with the present invention.

FIG. 2 shows in schematic form the blank 10a which is formed into a tubular sleeve S with overlapped ends. The sleeve is first flat folded with similar gusseted side folds, the top and bottom panels of the sleeve having different widths. The flattened sleeve is then folded double at an off-center region with its end edges spaced apart for multiple unit flat stacking and easy opening and use.

Figure 3:
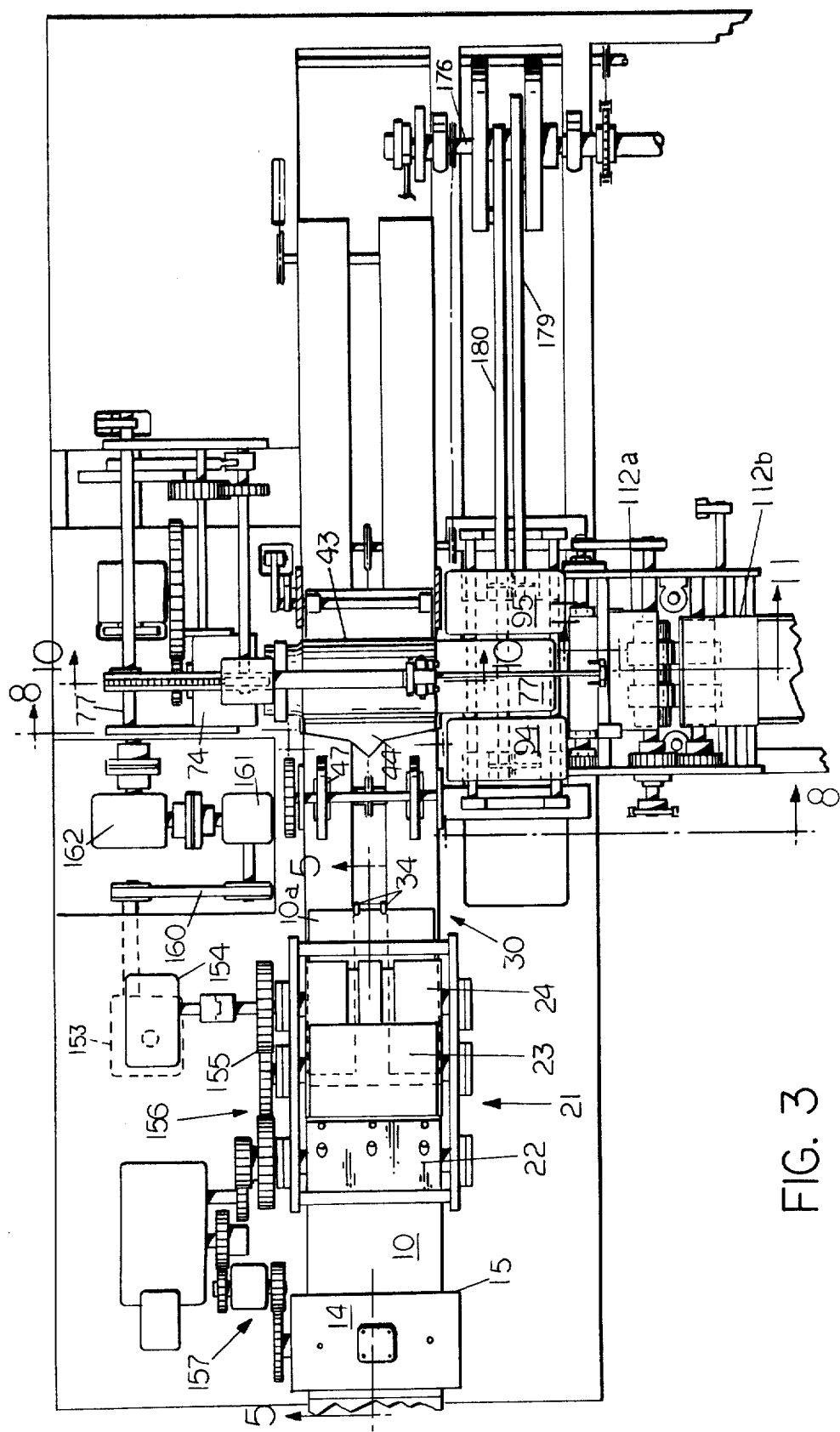
FIG. 3 is a top plan view of the apparatus for forming the individual tubular sleeves in accordance with the present invention.

The blanks are moved through the severing station 21 as shown in FIG. 5 with the decorative patterns on the blanks facing downwardly so that the blanks are delivered serially to the machine conveyor 30 in like manner. As shown in FIGS 3 and 5, resilient back-up roll 23 against which the rotary knife member 22 operates, is tangentially contacted by a second vacuum roll 24 which serves to deliver the severed blanks 10a onto the inlet end of the machine conveyor 30. Rolls 23 and 24 preferably have a series of vacuum apertures on their cylindrical surfaces to retain the web in positive alignment for precise retention of the blank during and after severance. A detection device 28 is located immediately below vacuum roll 23 and facing a loading roll 29 to permit smooth and accurate delivery of the web to the blank severing station.

Conveyor 30 has pairs of sprockets 31 at its ends over which are driven a pair of endless chains 32 located at opposite sides of the conveyor. A series of spaced-apart pairs of gripping fingers 34 are attached to the juxtaposed chains in transverse alignment on the conveyor. Each pair of fingers 34 is spaced apart a distance slightly lesser than the blank width so that each pair of fingers is able to grasp the leading edge of an individual blank immediately upon its delivery to the conveyor. The movable pairs of fingers 34 are able to be opened and closed by suitable camming means located in stationary relation along the path of the conveyor.

Figure 6:
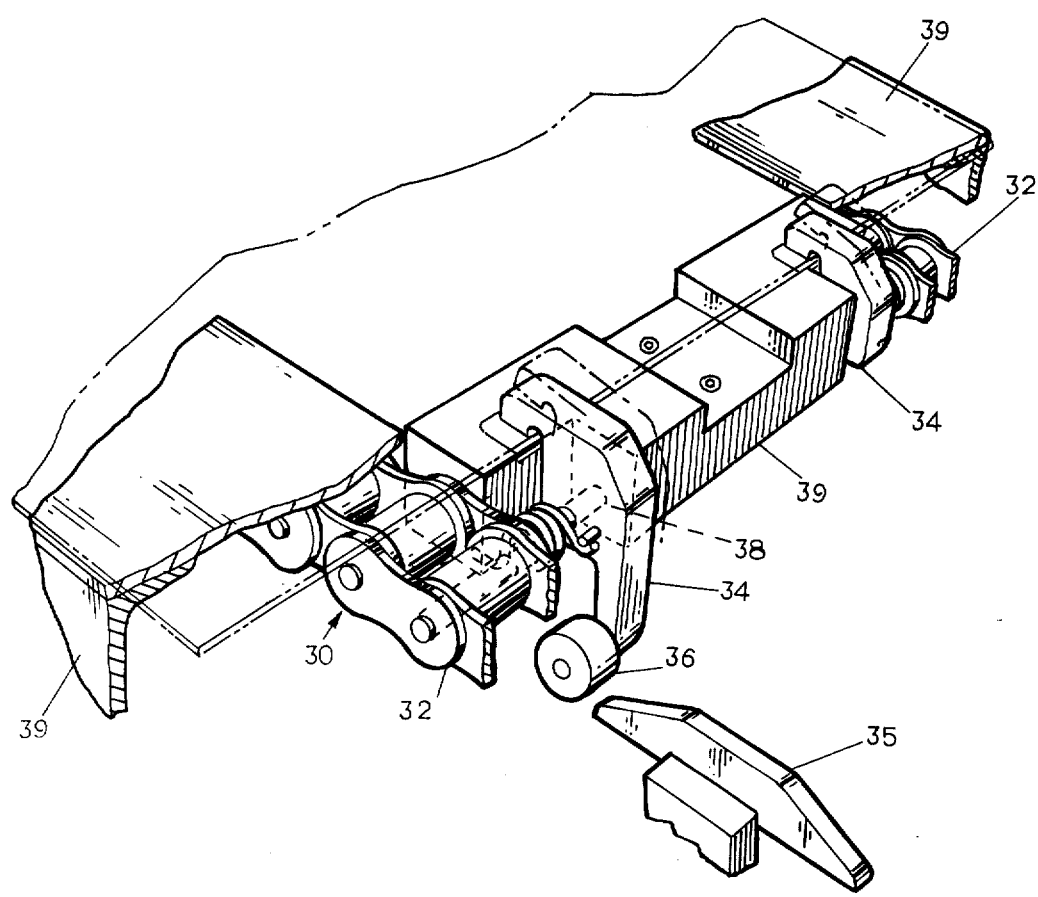
FIG. 6 is an enlarged fragmentary side elevational view of the sleeve forming station of the apparatus shown in FIGS. 3 and 4.

As shown in FIG. 6, stationary cam surface 35 is contacted by a cam follower 36 located on the underside of one pair of aligned gripping fingers 34 to open the fingers and firmly retain a blank leading edge. The finger pairs are mounted on a single oscillatable transverse shaft 37 adapted to move the fingers in unison. When cam follower 36 is moved in a clockwise direction by cam surface 35, the pair of fingers is opened to receive the blank. The fingers are closed to grip the blank end when the cam follower is moved off the cam surface 35 by forward movement of the conveyor.

Figure 7:
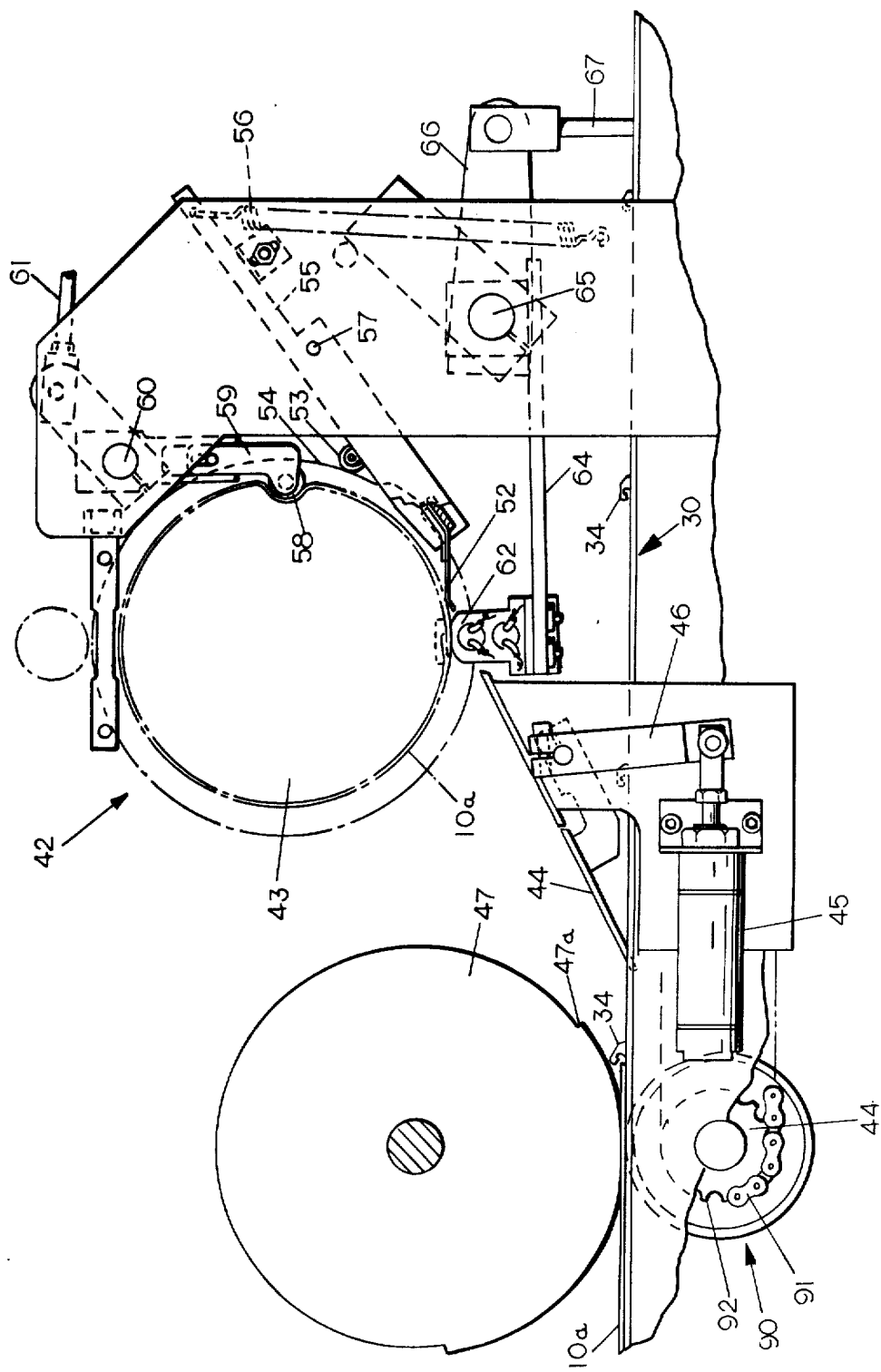
FIG. 7 is an enlarged fragmentary side elevational view of the sleeve forming station of the apparatus shown in FIGS. 3 and 4.

Roll 24 serves to deliver the leading edge of the blank 10a onto the conveyor 30 where its leading edge is firmly engaged by the fingers. As the blank is moved along horizontlly by the conveyor, its decorated surface faces downwardly against the conveyor surface. As shown in FIGS. 5, 6 and 7, the pair of movable gripping fingers 34 mounted on the transverse shaft 37 is spring loaded against a base block 38 within which the shaft is journaled. The fingers are thus able to firmly retain the blank leading edge against the upper flat surface of the block. Spaced side rails 39 assist in maintaining the blank in straight flat alignment on the conveyor.

Figure 4:
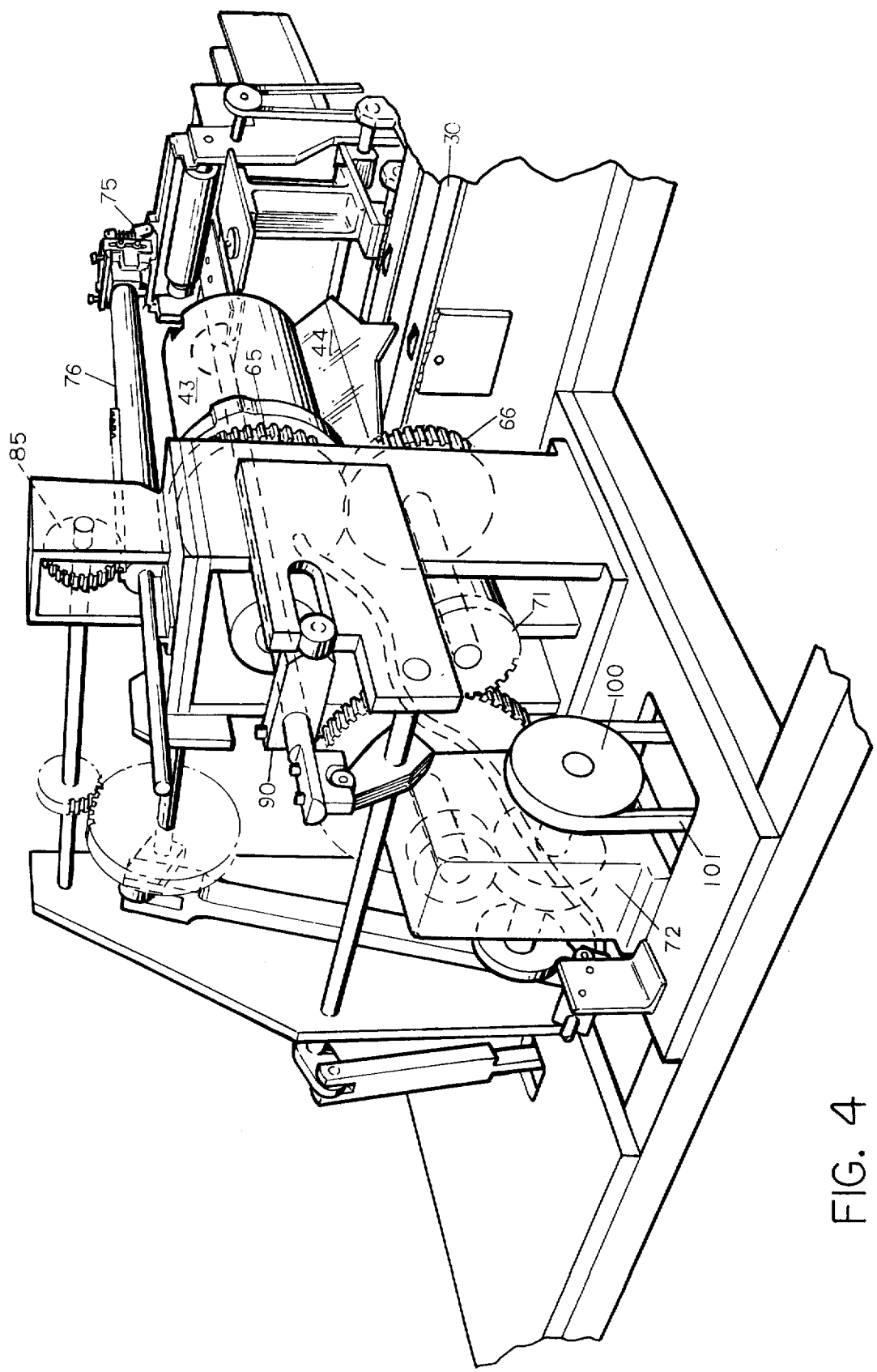
FIG. 4 is a persepctive view of the apparatus shown in FIG. 3.

The machine conveyor 30 moves the sleeve blanks 10a through a limited horizontal distance to a sleeve forming station 42, as shown in FIGS. 3, 4 and 7, where the blanks are individually elevated to a cylindrical forming mandrel 43 by an inclined pivoted ramp member 44. The ramp is located adjacent and immediately above the conveyor between the chains of its upper reach. The ramp is able to be pivoted downwardly by a suitable hydraulic or air cylinder 45 and arm member 46 shown in FIG. 7 to intercept the blank 10a as it is moved along the conveyor. A loading roller 47, as also shown in FIG. 7, is mounted over the conveyor transversely to its line of movement to contact the upper surface of blank 10a. After fingers 34 are disengaged from the leading edge of an individual blank, with roller 47 forcefully contacting the upper surface of the blank, the roller causes the blank to move upwardly on the pointed lower end of the ramp 44, in its lowered position, to bring the blank forward end to a position adjacent the forming mandrel 43.

The fingers 34 release the leading edge of the blank 10a just after the blank is conveyed to a point beyond roller 47 for its upward movement. Conveyor 30 has several powered rollers at spaced intervals at a medial region for supporting the blank after its release from finers 34. Overhead roller 47 has an enlarged sector-shaped surface to contact the blank and move it forwardly onto ramp 44 which is rotated downwardly to place its pointed leading edge in the path of the advancing blank. The blank is then moved up the ramp 44 by roller 47 to load the blank onto cylindrical forming mandrel 43.

Mandrel 43 has a series of apertures along one surface region connected to a vacuum line. The holding force of the vacuum apertures permits loading of the blank 10a onto the mandrel during slightly more than one powered revolution of the mandrel. Blank 10a is wrapped on the mandrel with its ends overlapped for fusion sealing, as shown in FIGS. 2 and 7. As the blank is fed onto the mandrel while retained by vacuum, it is contacted by a flexible shoe member 42 which is pivotally mounted to press against the blank as it is progressively wrapped around the mandrel. Such shoe action ensures that the blank is wrapped tightly around the mandrel in wrinkle-free condition to conform to its exterior cylindrical surface. A cam follower 53, as shown in FIG. 7, follows a suitable cam 54 to ensure that the shoe member 52 exerts the proper pressure on the blank during wrapping. Shoe member 52 is mounted on an arm 55 which is spring loaded by tension spring 56 and pivoted at pivot point 57.

After the blank 10 is fully wrapped on the mandrel with its ends overlapped, a slack bar member 58 is moved into a complemental recess in the mandrel cylindrical surface. Slack bar 58 has a cylindrical cross-section and a length at least as long as the sleeve blank, and fits into a complemental recess in the mandrel surface after the blank is wrapped on the mandrel and mandrel rotation is stopped. Any slack material in the blank as wrapped is removed by the slack bar and the blank is positively sized at its overlapped ends prior to forming the fusion seal. As also shown in FIG. 7, slack bar 58 is mounted on a suitable support arm 59 which is pivotally moved about pivot point 60. Arm 59 is moved by a secondary actuating arm 61 connected to suitable camming mechanism on the main power source of the machine.

Figure 10:
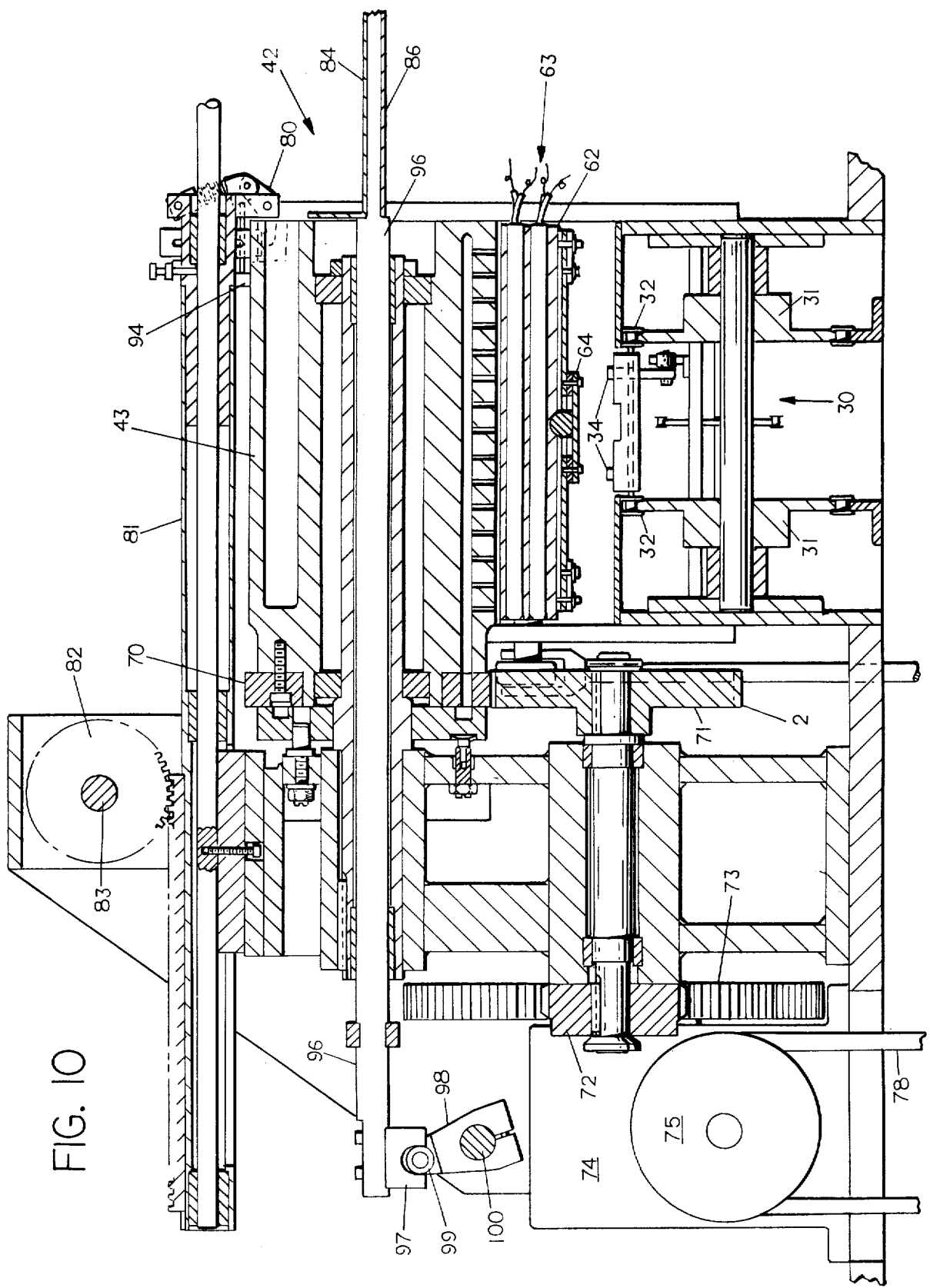
FIG. 10 is an enlarged vertical sectional view of the sleeve forming portion of the apparatus shown in FIGS. 3, 4 and 7 taken along the line 10—10 of FIG. 3.

As shown in FIGS. 7 and 10, heater bar 62 is operable upwardly to press forcefully against the overlapped ends of the blank 10a on the mandrel. The bar is electrically heated by electrical leads 63 to a temperature which will cause thermal fusion of the selected theremoplastic material upon pressure contact. Heater bar 62 extends throughout the axial length of the sleeve blank on the mandrel and is located in a position immediately below the mandrel and the intermediate overlapped ends. Heater bar 62 is mounted on a horizontal support arm 64 which is pivotally mounted to reciprocate about a pivot point 65. Support arm 64 is connected to a second arm 66 which is operated by a third reciprocating arm 67 connected to an eccentric cam member. These elements are shown in detail in FIG. 7. The heater bar 62 is shown in half-section in FIG. 10 with its electrical leads 63 for resistance-type heating.

Figure 8:
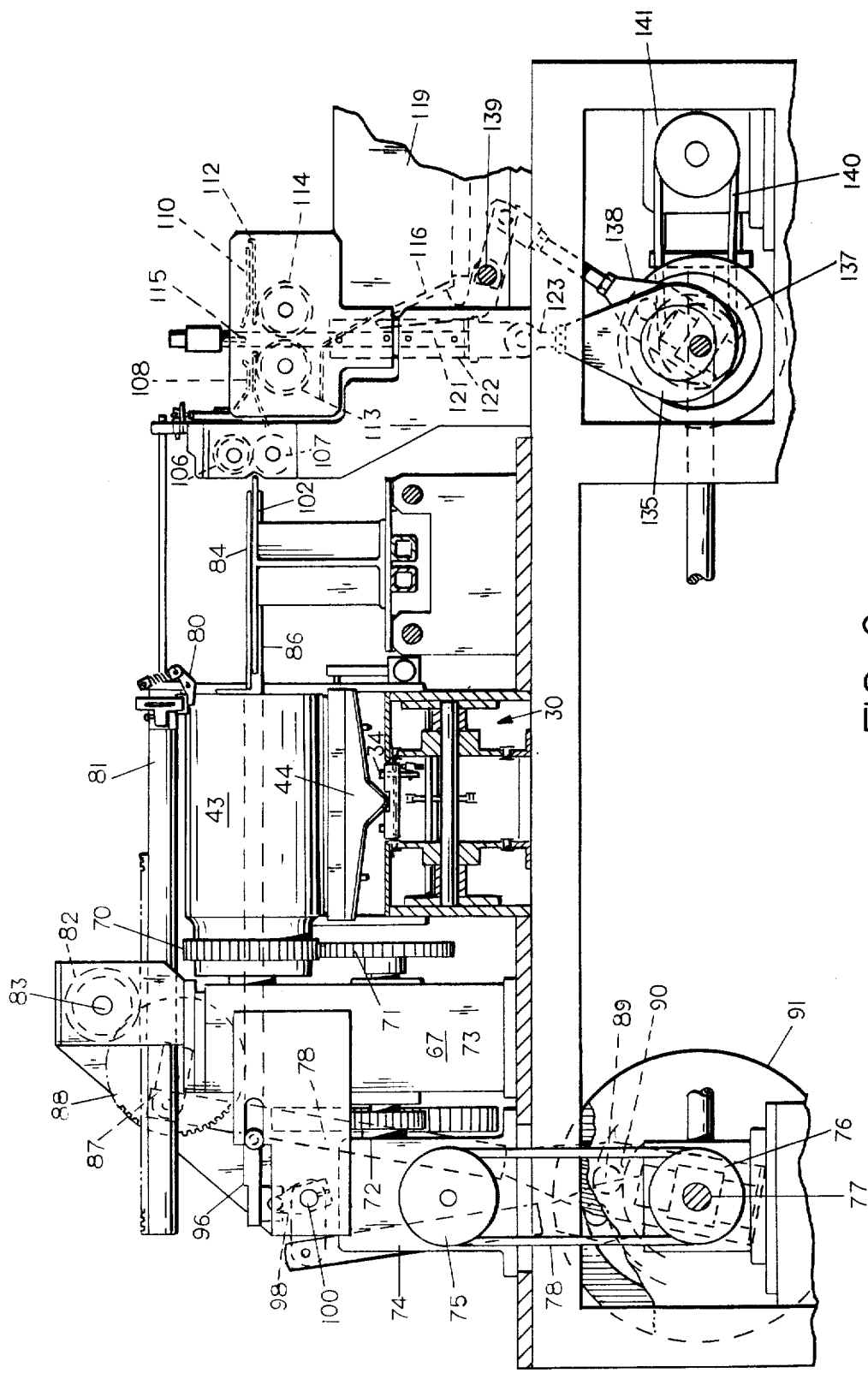
FIG. 8 is an enlarged vertical sectional view of the sleeve forming station of the apparatus taken along line 8—8 of FIG. 3.

FIG. 8 which is a vertical section of the machine shows the sleeve forming station in greater detail. Conveyor 30 is shown approaching the ramp member 44 for elevating the blank 10a into contact with forming mandrel 43. The mandrel is mounted in cantilevered relation and driven by a pair of meshing gears 70 and 71 mounted in vertical array above and at the side of the conveyor path at the sleeve-forming station. Gear 70 is mounted on a shaft having a drive gear 72 mounted on its other end. Drive gear 72 meshes with another gear 73 on the output shaft of a Ferguson drive 74. The imput shaft of Ferguson drive 74 has a first pulley 75 mounted thereon which is connected to a second pulley 76 mounted on the maindrive shaft 77 of the machine. An endless belt 78 connects the two pulleys 75 and 76 for driving the Ferguson drive 74 and the mandrel 43.

Immediately following formation of the tubular sleeve on the mandrel 43, the slack bar 58 is moved outwardly from the mandrel recess by its operating support arm 59 to free the newly-formed sleeve S on the mandrel. A pair of gripping fingers 80 located near the cantilevered free end of mandrel 43 is operable within cavities in the mandrel end to firmly grip the upper region of the sleeve end. Fingers 80 are mounted on a reciprocatable horizontal bar or rack member 81 which is oscillatable back and forth to pull the sleeve from the mandrel 43 and deliver it onto an aligned adjacent flat plate 84 around which it is folded. As shown in FIG. 10, rack 81 is journaled in a suitable slide to permit its reciprocal movement by a pinion 82 and gear 88. As shown in FIG. 8, rocker arm 87 is moved reciprocatably verticaly by a cam follower 89 which is operable within a cam track 90 in a cam 91 located on the main power shaft 77.

Figure 9:
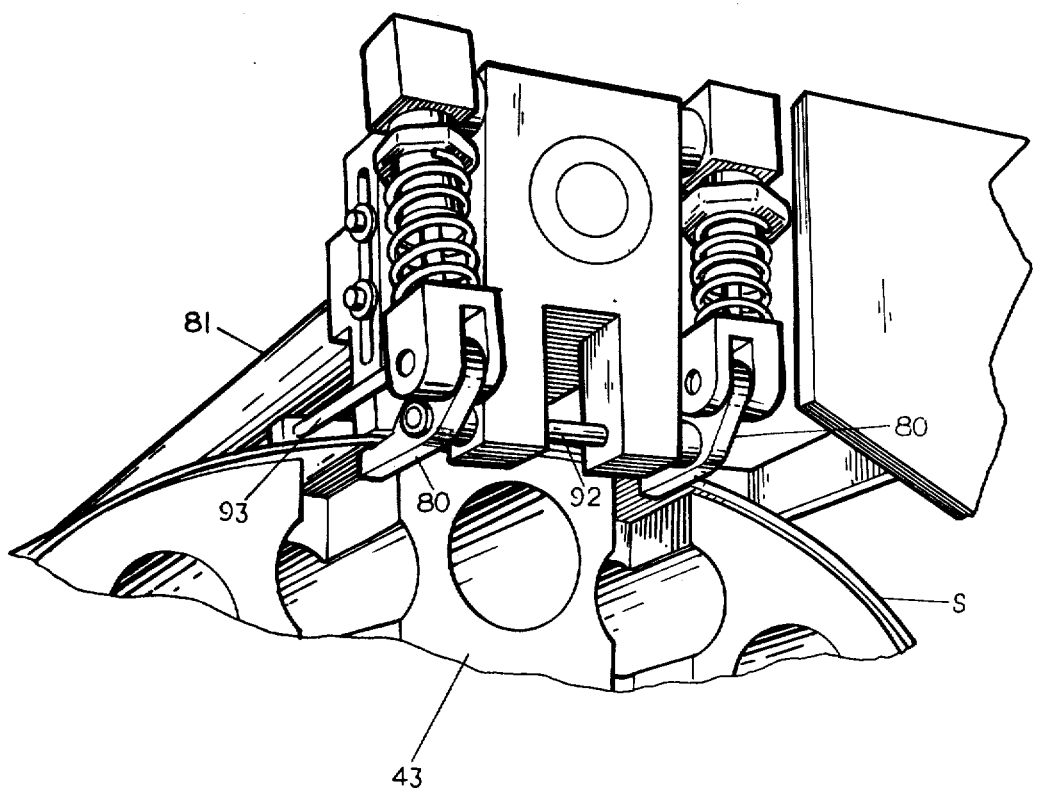
FIG. 9 is a further enlarged fragmentary perspective view of the gripping fingers at the sleeve forming station adapted to remove a newly-formed sleeve from the mandrel.

FIGS. 8 and 9 show the pair of gripping fingers 80 engaging the upper end portion of the sleeve as newly-formed. The fingers are spring loaded and mounted on a horizontal shaft 92 about which they are pivoted. Fingers 80 are operable in unison by arm member 93 positioned on the rack member 81. Arm member 93 serves to open and close the pair of gripping fingers 80 in unison as they are pivoted about shaft 92 at the limits of horizontal travel of rack member 81. Suitable cam member 94 mounted on the stationary slide which retains rack member 81 serves to operate arm member 93 to open and close fingers 80.

FIG. 10 shows the construction of the mandrel 43 and its associated members at the sleeve forming station 42. The mandrel has a gear 70 on its supported end from which it is cantilevered on a rotary hollow shaft. Gear 70 meshes with drive gear 71 which in turn is driven by gear 72 connected to gear 73. As stated, gear 73 in turn is driven by the Ferguson drive 74 powered by the main power shaft 77.

Heater bar 62 having electrical connections 63 attached thereto is shown in vertically reciprocatable relation below the mandrel. Rack member 81 is shown mounted in parallel overhead relation to the mandrel 43 immediately above its upper surface. Rack member 81 is operated by pinion 82 to move its gripping fingers 80 into engagement with the newly-formed sleeve S for its delivery onto aligned flat plate 84. Rack member 80 and heater bar 62 are preferably in vertical alignment with the mandrel axis.

Upper flat plate 84 has a length complemental to the axial length of the tubular sleeve and a width complemental to the top panel of the sleeve. When the sleeve is removed from the mandrel and draped over cantilevered arbor or plate 84, the sleeve top panel is co-extensive with the plate and the remainder of the sleeve sags there-below. Plate 84 is mounted on a long horizontal support bar 96 which extends through the hollow shaft of cantilevered mandrel 43. A second flat plate 86 is mounted in parallel closely-spaced relation beneath plate 84 on bar 96, said plates both comprising an arbor and having essentially equal lengths and differing widths comparable to the narrower and wider bottom panels of the sleeve S as formed. FIG. 10 shows horizontal support bar or arbor 96 extending through the mandrel with an end plate 97 connected to its supported end. End plate 97 is connected to a rocker arm 98 for moving the pair of reciprocatable plates 84 and 86 in unison through a limited horizontal distance. A cam follower 99 is located on one end of rocker arm 98 around which a recessed portion of end plate 97 is fitted. Rocker arm 98 is mounted on an oscillatable shaft 100 which is powered by the main drive shaft 77. Horizontal support bar or arbor 96 is thereby mounted for movement through a limited horizontal distance to move plates 84 and 86.

The rack member 81 for supporting the sleeve gripping fingers 80 is shown in FIG. 10 in its retracted position with its operating pinion 82 adapted to move the newly-formed sleeve fromforming mandrel to flat plates 84 and 86. These arbor plates are mounted in closely adjacent spaced-apart relation with a second pair of movable plates 102 and 104 adapted to patially penetrate the space therebetween. The second pair of plates 102 and 104 is mounted in horizontal coplanar relation between the planes of arbor plates 84 and 86. The second pair of flat plates 102 and 104 is operable in unison to contact juxtaposed exterior surfaces of the sleeve and fold the same around flat arbor plates 84 and 86, while stationarily maintained, into a pair of similar gusset folds. The spacing of flat arbor plates 84 and 86 is shown in FIG. 10 with movable coplanar plates 102 and 104 removed.

Figure 11:
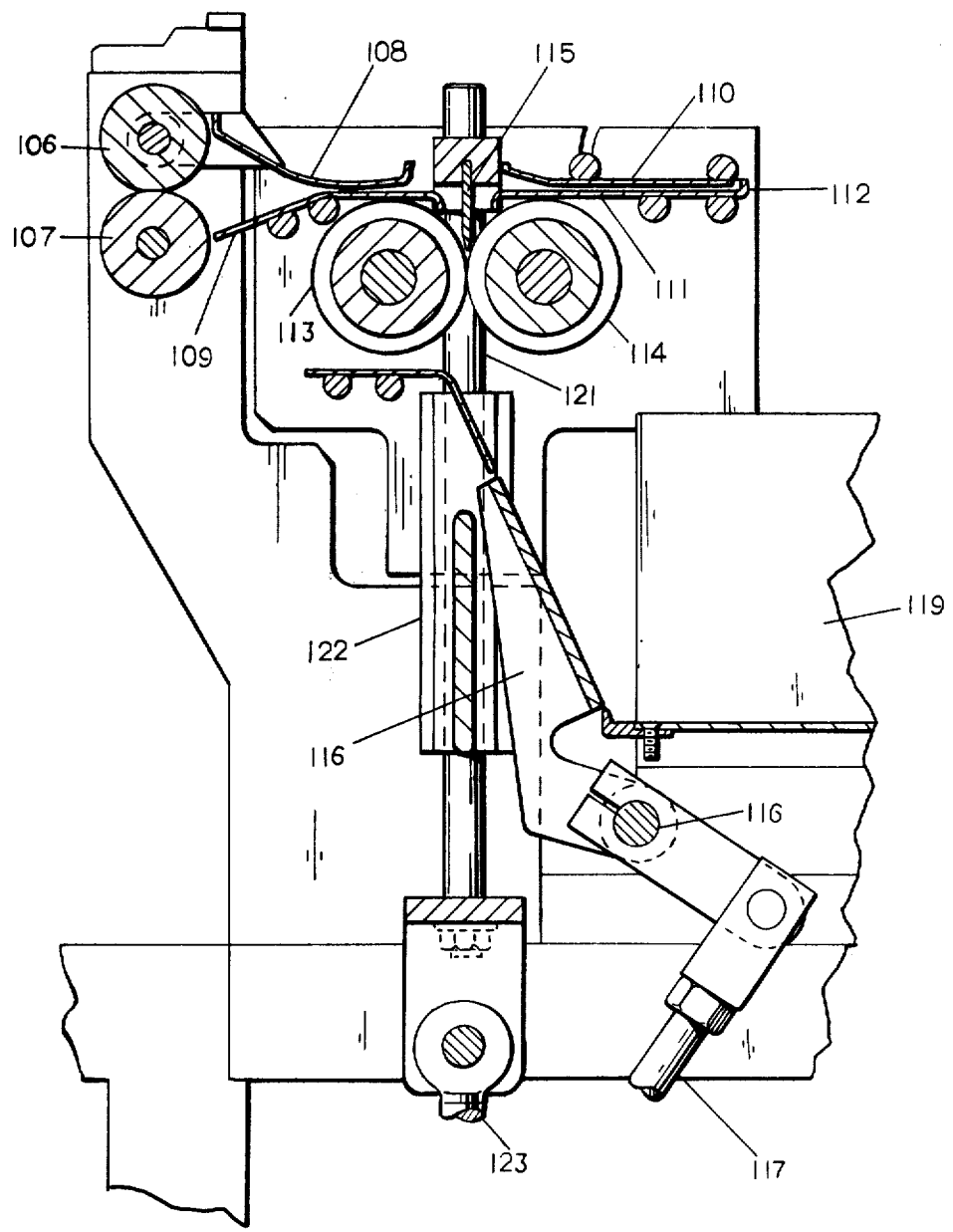
FIG. 11 is an enlarged vertical sectional view of the apparatus shown in FIGS. 3, 4 and 8 taken along the line 11—11 of FIG. 3.

A stated, horizontal bar or arbor is journaled within the hollow mandrel 43 so that it is horizontally reciprocatable. Rocker arm 98 is connected to reciprocatable shaft 100 having cam follower 99 located in recessed arm member 97 rigidly affixed to the bar 96. When rocker arm 98 is reciprocated by shaft 100, arbor 96 is extended to deliver the initially flat-folded sleeve S to an adjacent pair of transverse nip rolls 106 and 107 mounted in vertical array as shown in FIGS 8 and 11. The nip rolls serve to further flatten the gusset side folds of the sleeve S and convey the same through a pair of curved horizontal guide plates 108 and 109 which are closely-spaced to receive the sleeve and maintain it in flat form.

The sleeve is moved by the nip rolls 106 and 107 between the first pair of curved horizontal guide plates 108 and 109 to a second pair of horizontal guide plates 110 and 111, and then to a stop plate 112 to limit its horizontal travel. A vertically clear space is provided between the two pairs of horizontal guide plates.

A vertically-reciprocatable knife-edge plate 115 which is able to travel vertically through the juxtaposed pairs of guide plates is mounted above and between upper guide plates 108 and 110. Another pair of nip rolls 113 and 114 is located immediately below lower separated guide plates 109 and 111 adapted to double-fold the sleeve S at a near central region.

When the flattened sleeve is retained between the several pairs of spaced guide plates, the knife edge plate 115 is operated downwardly to move the sleeve downwardly in double-folded flat condition to be contacted by a horizontally-reciprocatable inclined plate or gate 116. Inclined plate 116 is pivotally mounted to be oscillated about pivot point 117 mounted immediately therebelow. An arm member 118 serves to pivot inclined plate or gate 116 to take the double-folded flat sleeve and move it into a collected stack in collection magazine 119.

Knife-edge plate 115 is mounted on the upper end of a vertical slide bar 121 which is journaled within a stationary slide block 122. A vertically movable arm member 123 serves to vertically move knife-edge plate 115 downwardly to move the sleeve into horizontal nip rolls 113 and 114 to obtain the double folding. Knife-edge plate 115 is normally held in its raised position when the sleeve is moved horizontally by the first pair of nip rolls 106 and 107. When the sleeve reaches the stop plate 112, knife-edge plate 115 is moved downwardly to contact an off-center portion of the sleeve to move it into the second pair of nip rolls 113 and 114 for its double flat folding.

Figure 12:
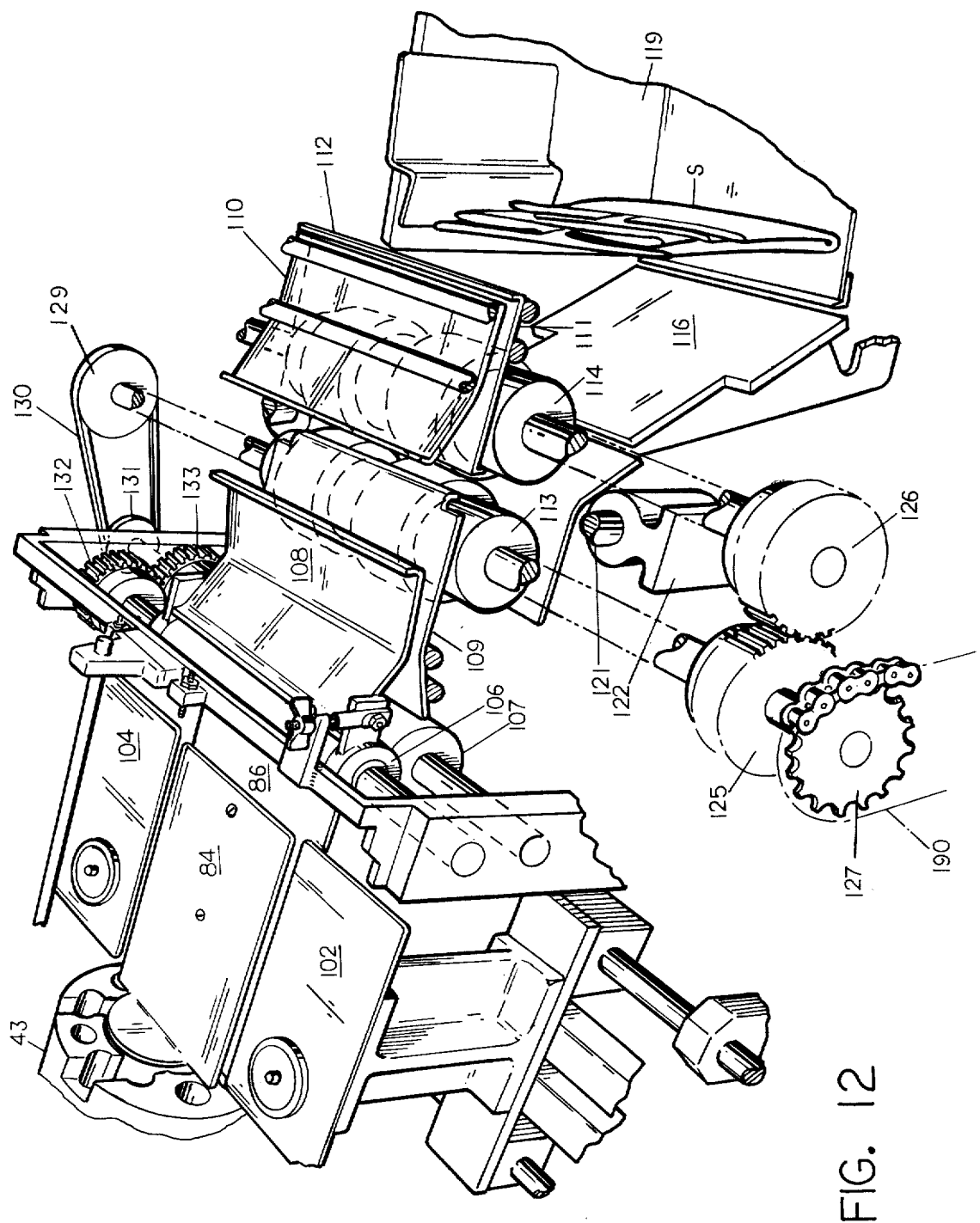
FIG. 12 is an enlarged fragmentary perspective view of the sleeve folding mechanism of the apparatus shown in FIGS. 3, 4 and 11.

FIG. 12 shows in perspective the mandrel 43 and upper flat arbor plate 84 onto which the sleeve is moved immediately after forming. Lower flat arbor plate 86 mounted immediately below upper plate 84 and having the wider lateral extent is also shown in FIG. 12. Horizontally movable flat side plates 102 and 104 which are operable in synchronism are shown on their respective slide rails for horizontal movement together and apart for the initial sleeve side folding.

Plates 102 and 104 are thus able to move into the narrow space between arbor plates 84 and 86 a controlled distance to effect side folding of the sleeve sides into a pair of similar gusset folds with the top panel being narrower than the bottom panel as determined by the widths of arbor plates 84 and 86, respectively. Immediately after the side folds are formed, plates 102 and 104 are moved outwardly in unison. The pair of arbor plates 84 and 86 on bar 81 are moved a short distance horizontally away from the mandrel 43 to deliver the end of flattened sleeve S between nip rolls 106 and 107. The sleeve is then moved through the two pairs of separated guide plates 108, 109 and 110, 111 to encounter stop member 112.

The horizontally-aligned second pair of nip rolls 113 and 114 which perform the double folding are driven in synchronism by meshing gears 125 and 126 which are powered by the machine main power source. A sprocket 127 is mounted on the other end of the shaft which extends through roll 113 and 125, as shown in FIG. 12. An endless chain 128 extends over sprocket 127 and connects with a second power-driven sprocket to drive the nip rolls 113 and 114. Pulley 129 is mounted on the same shaft as gear 125. Through an endless belt 130 and a second pulley 131, pulley 129 drives another pair of meshing gears 132 and 133 mounted on the same shafts as vertically-aligned nip rolls 106 and 107, respectively. Thus, both pairs of nip rolls are able to be rotated in unison by the same power source.

FIG. 8 and 11 show the mechanism for reciprocating knife-edge plate 115 downwardly and then upwardly in synchronism with the arrival of the sleeve S between the spaced pairs of guide plates. Vertical slide bar 121 which carries plate 115 on its upper end in vertical relation is moved vertically in reciprocating fashion by arm 123 connected to its lower end. Army 123 is connected to an eccentric member 135 as shown in FIG. 8 which is powered by main drive shaft 77. Each revolution of eccentric member 135 effects one downward and upward cycle of knife-edge plate 115 to force the sleeve downwardly through nip rolls 113 and 114.

Another eccentric member 137 is similarly mounted on main drive shaft 77 and connected to an arm member 138 which by its vertical movement and connection to pivoted inclined plate 116 effects its pivotal motion. Plate 116 is mounted to pivot around pivot point 139 when arm member 138 is moved vertically to load the double-folded sleeve S into collection magazine 119. Thus, each revolution of eccentric member 137 causes one pivotal cycle of inclined plate 116 for pushing the sleeves successively into the magazine. The magazine 119 has a lesser width dimension at its inlet opening for retaining the flat sleeves by friction after loading. The two eccentric members 135 and 137 are mounted on a common shaft which is powered by an endless belt 140 which joins two aligned pulleys on the drive shaft and gear box 141.

POWER SOURCE

Figure 13:
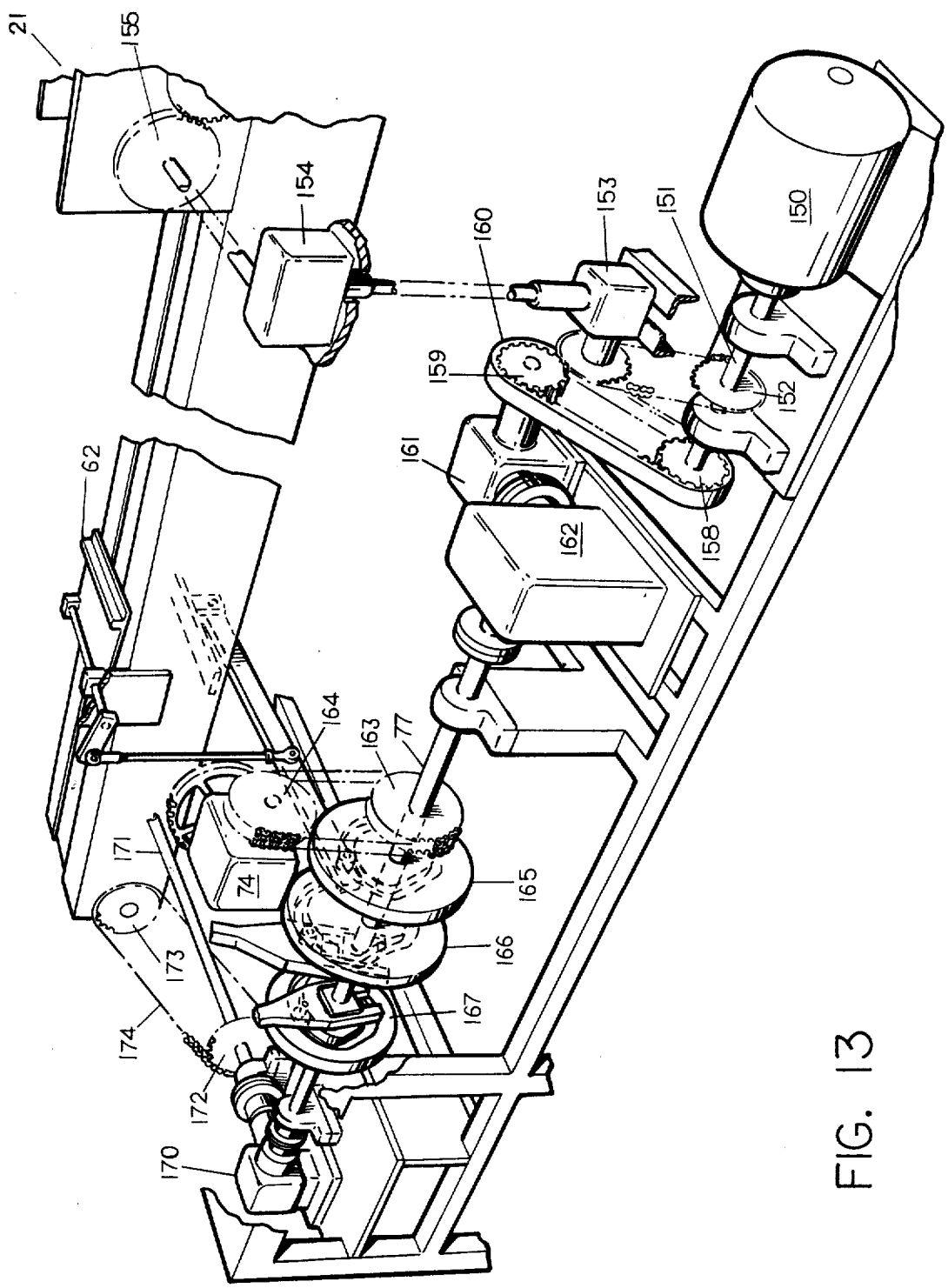
FIG. 13 is a fragmentary perspective view of the power train components of the apparatus.

A suitable heavy-duty large motor 150 as shown in FIG. 13 serves to power the aforesaid mechanisms of the machine. The power output shaft 151 of the motor drives a sprocket 152 which in turn drives a first gear box 153 and then a second gear box 154. The output shaft of second gear box 154 drives a gear 155 which in turn drives the web feeding rolls 14 and 15, as well as the rolls 23, 24 and knife member 22 at the blank severing station 21. As shown in FIG. 3, gear 155 drives a series of meshing gears which are connected to each of the rotary members 22, 23, 24 and 29 at the severing station. Such aligned meshing gears are designated by the numeral 156. Through another train of meshing gears designated by the numeral 157, the power-driven rolls 14 and 15 are actuated.

Another sprocket 158 is mounted on the output shaft of motor 150 which drives a second sprocket 159 through an endless belt 160. A pair of interconnected speed reduction gear boxes 161 and 162 are driven by the second gear box 162 to power the main power shaft 77 of the machine. Shaft 77 has a sprocket 163 thereon which connects to a second sprocket 165 through an endless belt to power rotary movement of the mandrel 43 by means of Ferguson drive 74. The mandrel is driven intermittently in timed relation through slightly more than one revolution to wrap the blank thereon. Such rotation is effected immediately after ramp 44 is actuated by suitable camming mechanism to elevate the blank leading edge into contact with the mandrel. A cam 165 is mounted on shaft 77 to actuate the heater bar 62 into and out of contact with the overlapped blank ends in property timed relation with mandrel rotation. Another cam 166 is mounted on shaft 77 adjacent to cam 165 to operate the rack and pinion members 81 and 82 to obtain axial removal of the newly-formed sleeve from the mandrel. Still another cam 167 is mounted on shaft 77 to operate the horizontal support bar 96 in reciprocating relation to move flat plates 84 and 86 with the sleeve folded therearound. The extended end of the sleeve is thereby fed into the nip rolls 106 and 107 for its removal from the flat plates.

Main power shaft 77 extends into a right-angled gear box 170 mounted at the machine end facing away from motor 150 as shown in FIG. 13. The output shaft 171 of grear box 170 has a sprocket 172 thereon which is connected to a second sprocket 173 by an endless chain drive 174 to drive the machine conveyor 30.

Figure 14:
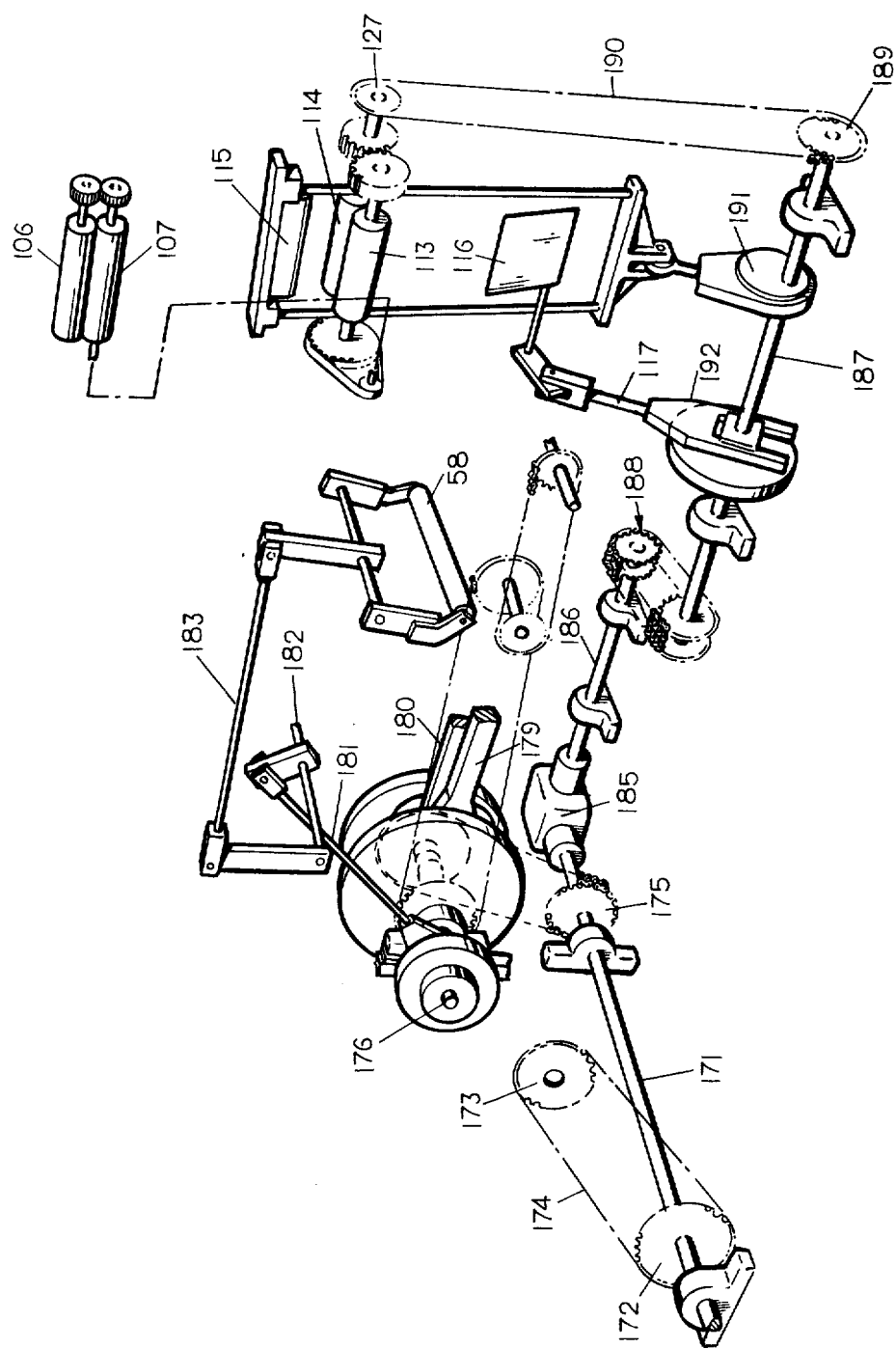
FIG. 14 is a fragmentary schematic view of additional power train components of the apparatus.

As shown in FIG. 14, shaft 171 which provides the conveyor drive extends across the distant end of the machine beneath the end of conveyor 30. Another sprocket 175 is mounted on shaft 171 and connected to another sprocket (not shown) on camshaft 176. Several eccentric cam members 177 and 178 are mounted on camshaft 176 and, by means of elongated arm members 179 and 180, connected to movable sleeve folding plates 102 and 104. Such arms are able to move the flat folding plates in unison into the space between adjacent plates 84 and 86. Another cam (not shown) is mounted on camshaft 176 having several elongated pivoted arms designated by the numerals 181, 182 and 183, which are able to effect timed movement of slack bar 58 into the mandrel recess.

Figure 15:
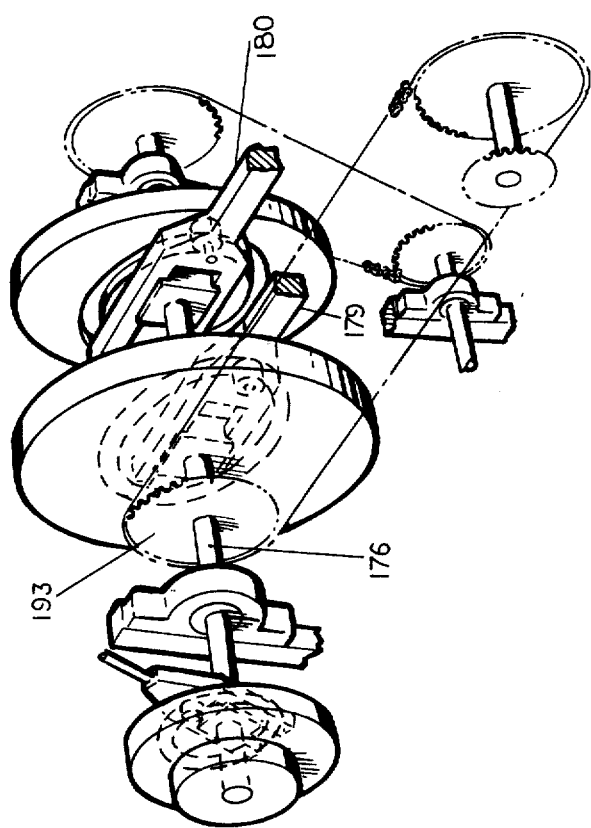
FIG. 15 is a further enlarged fragmentary perspective view of a portion of the power train components shown in FIG. 14.

Another right-angled gear box 185 is connected to shaft 171 with its output shaft 186 connected to a second drive shaft 187 by a pair of sprockets and an endless chain designated by the numeral 188. Shaft 187 powers a sprocket 189 which through endless chain 190 drives sprocket 127. As aforesaid, the two pairs of nip rolls 106, 107 and 113, 114 are driven by sprocket 127. An eccentric cam 191 on shaft 187 drives knife-edge plate 115 reciprocatably vertically in timed relation to force the flat sleeve downwardly between nip rolls 113 and 114 for its double folding. Another eccentric cam 92 connected to arm 117 actuates inclined plate or gate 116 in properly timed sequence. Sprocket 193 for driving the machine conveyors and the eccentric cam members for driving elongated arms 179 and 180 are shown in greater detail in FIG. 15.

The machine as shown has only one sleeve forming station 42 located transversely to the path of conveyor 30. However, second or third sleeve forming stations may be located along the path of conveyor 30 at spaced intervals as desired. By proper actuation of ramp member 44 only every second or third blank 10a conveyed past the first sleeve forming station may be elevated at the location of such second or third station for sleeve formation. Thus, alternate blanks may then be passed to subsequent stations for their formation thereat.

Various modifications may be resorted to within the spirit and scope of the appended claims.

I claim:

1. The method of making a tubular heat-shrinkable plastic wrap for containers comprising the steps of supplying a lengthy sheet of oriented thermoplastic material in roll form having a prescribed width with its primary orientation extending in a lengthwise direction, said sheet having repetitive decorative patterns on one surface with undecorated space therebetween, delivering the decorated sheet between rollers adapted to length and pattern measurement, severing the sheet at its undecorated spaces into blanks having prescribed width and length dimensions with a decorative pattern thereon, moving said blanks horizontally along a conveyor to a rotary cantilevered mandrel mounted horizontally and transversely thereover, interposing a ramp in the path of an individual blank on said conveyor to elevate said blank into contact with said mandrel, cretaining the leading edge of said blank on said mandrel by vacuum to wrap the same thereon during about one revolution of said rotary mandrel, heat sealing the overlapped edges of said blank on said mandrel while stationarily retained, removing said tubular wrap axially from said mandrel, folding the juxtaposed side poritons of said wrap inwardly to form similar gusset folds and to flatten the wrap, and folding the flattened wrap transversely at an off-center region of its top portion to double-fold said wrap having uneven open edges at its adjacent ends.

2. The method in accordance with claim 1, including the step of heat sealing said wrap with a heated sealing bar adapted to reciprocatable movement toward and away from said mandrel to contact the overlapped edges of said blank.

3. The method in accordance with claim 1, including the step of firmly restraining the wrap against said mandrel by a slack eliminating bar during the stationary heat sealing of said wrap.

4. The method in accordance with claim 1, wherein said lengthly sheet of thermoplastic material comprises a composite foam and film laminated sheet of polyethylene having a thickness not less than about 0.004 inch.

5. The method in accordance with claim 1, including the step of folding the juxtaposed side portions of said wrap into similar gusset folds by pairs of adjacent intermeshing fixed and movable horizontal flat plates upon removal of said tubular wrap from said mandrel.

6. The method in accordance with claim 1, including the step of folding the juxtaposed side portions of said wrap into flattened gusset folds with the bottom panel having a greater width than the top panel.

7. The method in accordance with claim 1, including the step of folding the top panel on itself adjacent a central region so that the open end edges are substantially apart with said wrap in double-folded flattened condition.

8. The method in accordance with claim 1, including the step of removing said newly-formed tubular wrap axially from said mandrel immediately after heat sealing by a pair of reciprocatable grasping fingers mounted laterally to said conveyor and adjacent said mandrel operable over a distance greater than the axial length of said wrap.

9. The method in accordance with claim 1, including the step of unwinding said lengthy sheet of thermoplastic material between a pair of rolls for its pattern inspection and length measurement prior to severance thereon into said blanks for delivery onto said conveyor.

10. The method of making a tubular heat-shrinkable plastic sleeve for wrapping a plurality of similar containers comprising the steps of supplying a lengthy rolled sheet of thermoplastic material having a prescribed width with its primary orientation extending in a lengthwise direction and its secondary orientation extending in a transverse direcion, said sheet having repetitive decorative patterns printed on one surface with unprinted space therebetween, passing said decorated sheet between rollers adapted to mesure prescribed lengths of said sheet, serially severing prescribed lengths of said sheet into blanks having prescribed width and length dimensions with a decorative pattern thereon, transporting said blanks serially and horizontally along a conveyor to a rotary contilevered mandrel mounted horizontally thereover in transverse relation, interposing a vertically-reciprocatable ramp in the path of an individual blank on said conveyor to elevate its leading edge into contact with said mandrel, retaining the leading edge of said blank on said mandrel by vacuum, wrapping said blank on said cantilevered mandrel by about one revolution thereof to overlap the ends into proximity with a reciprocatable heated sealing bar with the decorative pattern on said blank exteriorly disposed, heat sealing the overlapped ends of said blank while maintained stationarily on said mandrel by physical contact with said reciprocatable heated sealing bar, immediately removing the newly-formed tubular sleeve from said mandrel by gripping fingers effecting its axial movement away from said mandrel, depositing said sleeve on a first upper stationary plate having a width comparable to the top panel of said sleeve as printed and surrounding a second lower stationary plate having a width comparable to the bottom panel of said sleeve, moving a pair of horizontally-reciprocatable plates together against the sides of said sleeve between said upper and lower adjacent stationary plates to form a pair of similar gusseted side folds around said stationary plates, moving the initially flat-folded sleeve axially from said plates between a pair of nip rolls to further flatten the sleeve, and folding the top panel on itself in an off-center region to doubly flat-fold the sleeve with its relative ends disposed substantially apart.

11. The method in accordance with claim 10, wherein said blanks are transported on said conveyor with their decorative patterns facing downwardly and said sleeves are formed with said patterns facing exteriorly.

12. The method in accordance with claim 10, wherein said lengthy rolled sheet of thermoplastic material comprises a foam and film sheet of polyethylene having a thickness ranging from about 0.004 to 0.010 inch.

13. The method in accordance with claim 10, including the step of tightly restraining said blank against said mandrel by a slack eliminating bar co-extensive with the blank width during the heat sealing of its overlapped ends.

14. The method in accordance with claim 10, including the step of grasping one edge portion of said newly-formed tubular sleeve and pulling said sleeve from said mandrel axially for its deposition on said first upper stationary plate and its initial flat folding.

15. The method in accordance with claim 10, including the step of releasing said tight restraint of said blank on said mandrel immediatley following heat sealing to permit removal of the newly-formed sleeve therefrom.

16. Combined apparatus for making tubular plastic sleeves of heat-shrinkable thermoplastic material comprising a roll stand for retaining a lengthly rolled sheet of thermoplastic material of prescribed width, said sheet having repetitive decorative patterns printed on one surface with unprinted spaces therebetween, severing means for cutting said sheet serially at said unprinted spaces into blanks having prescribed width and length dimensions, a conveyor for transporting said blanks horizontally to a sleeve-forming position, a rotary cantilevered mandrel mounted transversely and horizontally above said conveyor at said sleeve-forming position, reciprocatable ramp means for elevating the leading edge of said blank at said sleeve-forming position into contact with said rotary cantilevered mandrel, vacuum means extending along one axially-aligned portion of the cylindrical surface of said mandrel adapted to positively retain the leading edge of said blank, means for rotating said mandrel about one revolution to wrap said blank thereon to overlap its leading and trailing edges, a reciprocatable heat sealing bar mounted in alignment adjacent said mandrel to contact the overlapped edges of said blank, means for moving said heat-sealing bar into and out of contact with said blank to effect an axial fusion seal, means for removing the newly-formed sleeve from said cantilevered mandrel by axial movement onto a pair of stationary flat plates axially aligned with said mandrel, a pair of horizontally-reciprocatable flat plates mounted adjacent and intermediate said pair of stationary flat plates, means for moving the horizontally-reciprocatable flat plates simultaneously between said pair of stationary flat plates to fold the juxtaposed side portionss of said sleeve inwardly into a pair of gusset folds, means for removing the flat-folded sleeve axially from between said plates, means for folding the flattened sleeve adjacent a central region of its top portion to double fold the said flattened sleeve, and means for moving the double-folded flattened sleeve into a tightly-aligned stack.

17. Combined apparatus in accordance with claim 16, wherein said severing means comprises a rotary drum and a rotary knife edge operable in cooperative tangential relation to sever said plastic sheet therebetween transversely at said unprinted spaces into said blanks.

18. Combined apparatus in accordance with claim 16, including retaining means mounted adjacent said mandrel in the form of a slack eliminating bar to firmly restrain said blank against said mandrel prior to heat sealing its overlapped edges.

19. Combined apparatus in accordance with claim 16, wherein said means for elevating the blank leading edge comprises a vertically-reciprocatable ramp member mounted centrally in the path of said conveyor immediately preceding said rotary cantilevered mandrel.

20. Combined apparatus in accordance with claim 16, wherein said vacuum means extending along one axially-aligned portion of the mandrel cylindrical surface comprises a series of spaced-apart apertures interconnected to a vacuum line.

21. Combined apparatus in accordance with claim 16, wherein said first and second stationary flat plates are mounted closely adjacent to each other and in axial alignment with said mandrel, the said pair of horizontally-reciprocatable flat plates operable therebetween to contact the exterior surface of said sleeve and fold the opposing side portions of said sleeve inwardly around said stationary plates into similar gusset folds.

22. Combined apparatus in accordance with claim 16, wherein said means for removing the flat-folded sleeve from said flat plates after side folding into gusset folds comprising a pair of reciprocatable finger elements and a pair of rotatable horizontal nip rolls mounted adjacent and in alignment with the ends of said stationary plates, and means for oscillating said nip rolls in conjunction as a unit to grasp said sleeve from said finger elements to remove said sleeve from said stationary plates and flatten the same therebetween.

23. Combined apparatus in accordance with claim 16, wherein said means for double folding the flattened sleeve adjacent a central region comprises a vertically-reciprocatable flat plate mounted adjacently above and parallel to said nip rolls for contacting and moving the flat-folded sleeve downwardly between said nip rolls.

24. Combined apparatus in accordance with claim 16, wherein said means for removing the newly-formed sleeve from said cantilevered mandrel comprises a pair of horizontally-reciprocatable gripping fingers adapted to grasp the upper edge of the newly-formed sleeve and remove the same from said mandrel.

25. Combined apparatus in accordance with claim 16, wherein said pair of upper and lower stationary plates are mounted horizontally having widths comparable to the top and bottom panels of said newly-formed sleeve, respectively, said plates having similar lengths at least as long as the axial length of said sleeve.

26. Combined apparatus in accordance with claim 16, including retaining means mounted adjacent said mandrel comprising a slack-eliminating cylindrical horizontal bar, means to reciprocate said slack-eliminating bar against said mandrel, said mandrel having an axially-extending hollow recess in its exterior cylindrical surface adapted to receive said bar and tighten said blank against said mandrel with its ends overlapped for sealing.

* * * * *